US012670702B2

(12) United States Patent
Bhaskar et al.

(10) Patent No.: US 12,670,702 B2
(45) Date of Patent: Jun. 30, 2026

(54) WHITE-BOX TEMPERATURE SCALING FOR UNCERTAINTY ESTIMATION IN OBJECT DETECTION

(71) Applicant: Ford Global Technologies, LLC, Dearborn, MI (US)

(72) Inventors: Sandhya Bhaskar, Sunnyvale, CA (US); Nikita Jaipuria, Pittsburgh, PA (US); Jinesh Jain, San Francisco, CA (US); Shreyasha Paudel, Sunnyvale, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 334 days.

(21) Appl. No.: 17/944,398

(22) Filed: Sep. 14, 2022

(65) Prior Publication Data

US 2024/0112454 A1    Apr. 4, 2024

(51) Int. Cl.
*G06V 10/776* (2022.01)
*G06V 10/764* (2022.01)
(Continued)

(52) U.S. Cl.
CPC .......... *G06V 10/776* (2022.01); *G06V 10/764* (2022.01); *G06V 10/774* (2022.01); *G06V 10/82* (2022.01); *G06V 10/98* (2022.01)

(58) Field of Classification Search
CPC .. G06V 10/776; G06V 10/764; G06V 10/774; G06V 10/82; G06V 10/98;
(Continued)

(56) References Cited

U.S. PATENT DOCUMENTS 10,769,493 B2    9/2020 Yu et al.
2019/0043003 A1*  2/2019 Fisher .................... G06V 10/82
(Continued)

OTHER PUBLICATIONS

Schwaiger, F., et al., "From Black-box to White-box: Examining Confidence Calibration under different Conditions," arXiv:2101.02971v1 [cs.CV], Jan. 8, 2021, 8 pages.
(Continued)

*Primary Examiner* — Amandeep Saini
*Assistant Examiner* — Emma Rose Goebel
(74) *Attorney, Agent, or Firm* — Frank A. MacKenzie; Brooks Kushman P .C.

(57)    ABSTRACT

A system and method includes determining uncertainty estimation in an object detection deep neural network (DNN) by retrieving a calibration dataset from a validation dataset that includes scores associated with all classes in an image, including a background (BG) class, determining background ground truth boxes in the calibration dataset by comparing ground truth boxes with detection boxes generated by the object detection DNN using an intersection over union (IoU) threshold, correcting for class imbalance between ground truth boxes and background ground truth boxes in a ground truth class by updating the ground truth class to include a number of background ground truth boxes based on a number of ground truth boxes in the ground truth class, estimating uncertainty of the object detection DNN based on the class imbalance correction, and updating output data sets of the object detection DNN based on the class imbalance correction.

16 Claims, 6 Drawing Sheets

(51) Int. Cl.

| | |
|---|---|
| *G06V 10/774* | (2022.01) |
| *G06V 10/82* | (2022.01) |
| *G06V 10/98* | (2022.01) |

(58) Field of Classification Search
CPC ........ G06V 10/25; G06V 20/56; G06V 20/58; G06V 20/588; G06N 3/0464; G06N 3/09; G06N 3/048
See application file for complete search history.

(56) References Cited

U.S. PATENT DOCUMENTS

| | | | |
|---|---|---|---|
| 2020/0193628 A1* | 6/2020 | Chakraborty ....... | G06F 18/2415 |
| 2021/0089908 A1* | 3/2021 | Schaul ................ | G06F 18/2415 |
| 2021/0110253 A1* | 4/2021 | Büttner ............... | G06V 10/776 |
| 2021/0117760 A1 | 4/2021 | Krishnan et al. | |
| 2021/0365781 A1 | 11/2021 | Zhang et al. | |
| 2022/0414869 A1* | 12/2022 | Butler .................. | G06V 10/454 |
| 2023/0068516 A1* | 3/2023 | Patel .................... | G06V 10/771 |
| 2023/0131284 A1* | 4/2023 | Lim ....................... | G06V 10/82 |
| | | | 382/103 |
| 2023/0169150 A1* | 6/2023 | Ha ......................... | G06V 10/22 |
| | | | 382/159 |
| 2024/0070516 A1* | 2/2024 | Patel ...................... | G06N 3/08 |

OTHER PUBLICATIONS

Kuppers, F., et al., "Multivariate Confidence Calibration for Object Detection," CVPR, 2020, 9 pages.
Guo. C. et al., "On Calibration of Modern Neural Networks," Proceedings of the 34 th International Conference on Machine Learning, 2017, 10 pages.

* cited by examiner

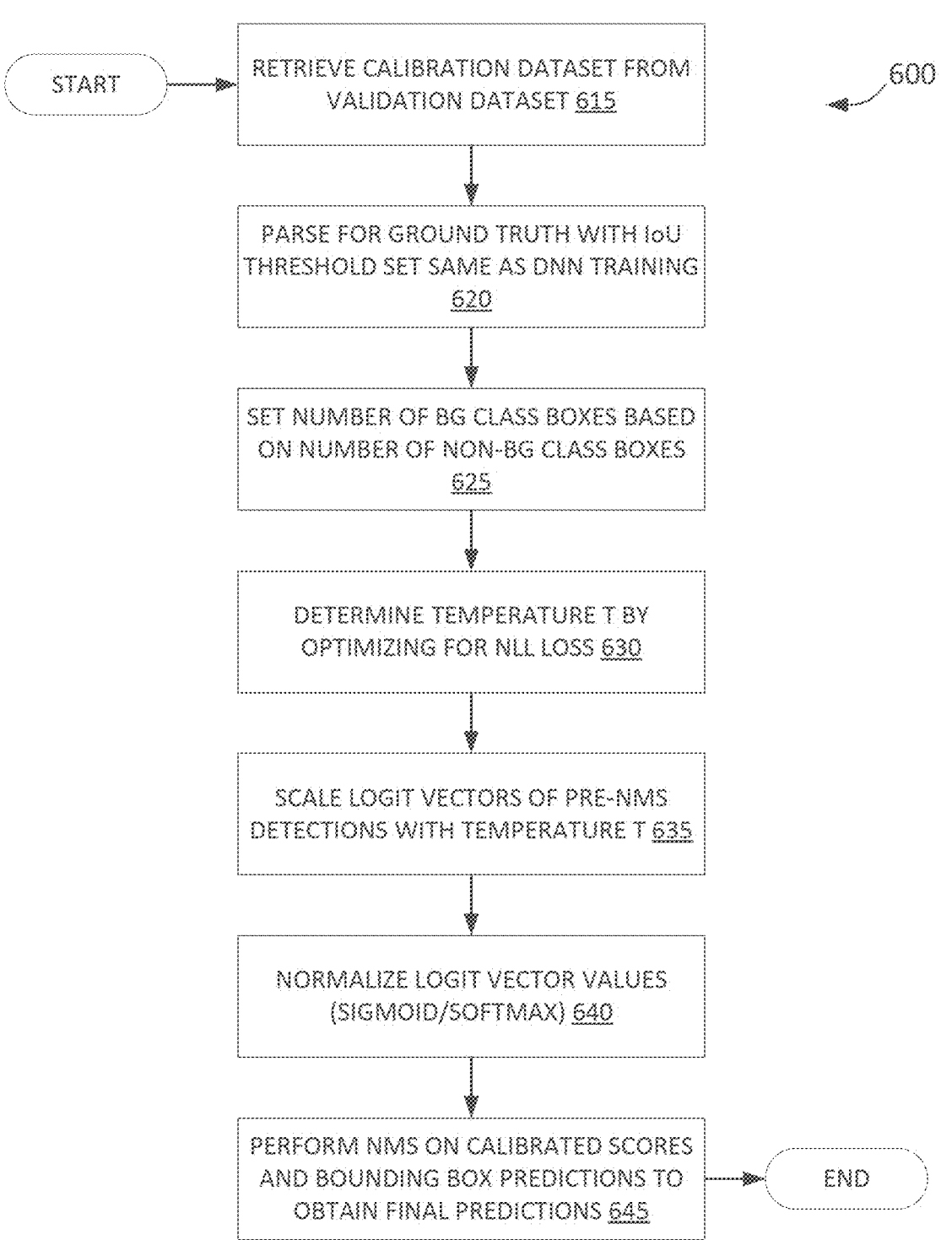

600

START → RETRIEVE CALIBRATION DATASET FROM VALIDATION DATASET 615

PARSE FOR GROUND TRUTH WITH IoU THRESHOLD SET SAME AS DNN TRAINING 620

SET NUMBER OF BG CLASS BOXES BASED ON NUMBER OF NON-BG CLASS BOXES 625

DETERMINE TEMPERATURE T BY OPTIMIZING FOR NLL LOSS 630

SCALE LOGIT VECTORS OF PRE-NMS DETECTIONS WITH TEMPERATURE T 635

NORMALIZE LOGIT VECTOR VALUES (SIGMOID/SOFTMAX) 640

PERFORM NMS ON CALIBRATED SCORES AND BOUNDING BOX PREDICTIONS TO OBTAIN FINAL PREDICTIONS 645 → END

FIG. 6

WHITE-BOX TEMPERATURE SCALING FOR UNCERTAINTY ESTIMATION IN OBJECT DETECTION

BACKGROUND

Automated driving can use deep neural networks (DNNs) for various perception tasks and rely on the scores output by the perception DNNs to determine the uncertainty associated with the predicted output.

BRIEF DESCRIPTION OF THE DRAWINGS

FIG. 6 is an example flow diagram of a white-box temperature scaling (WB-TS) process.

DETAILED DESCRIPTION

Figures 1A, 1B:
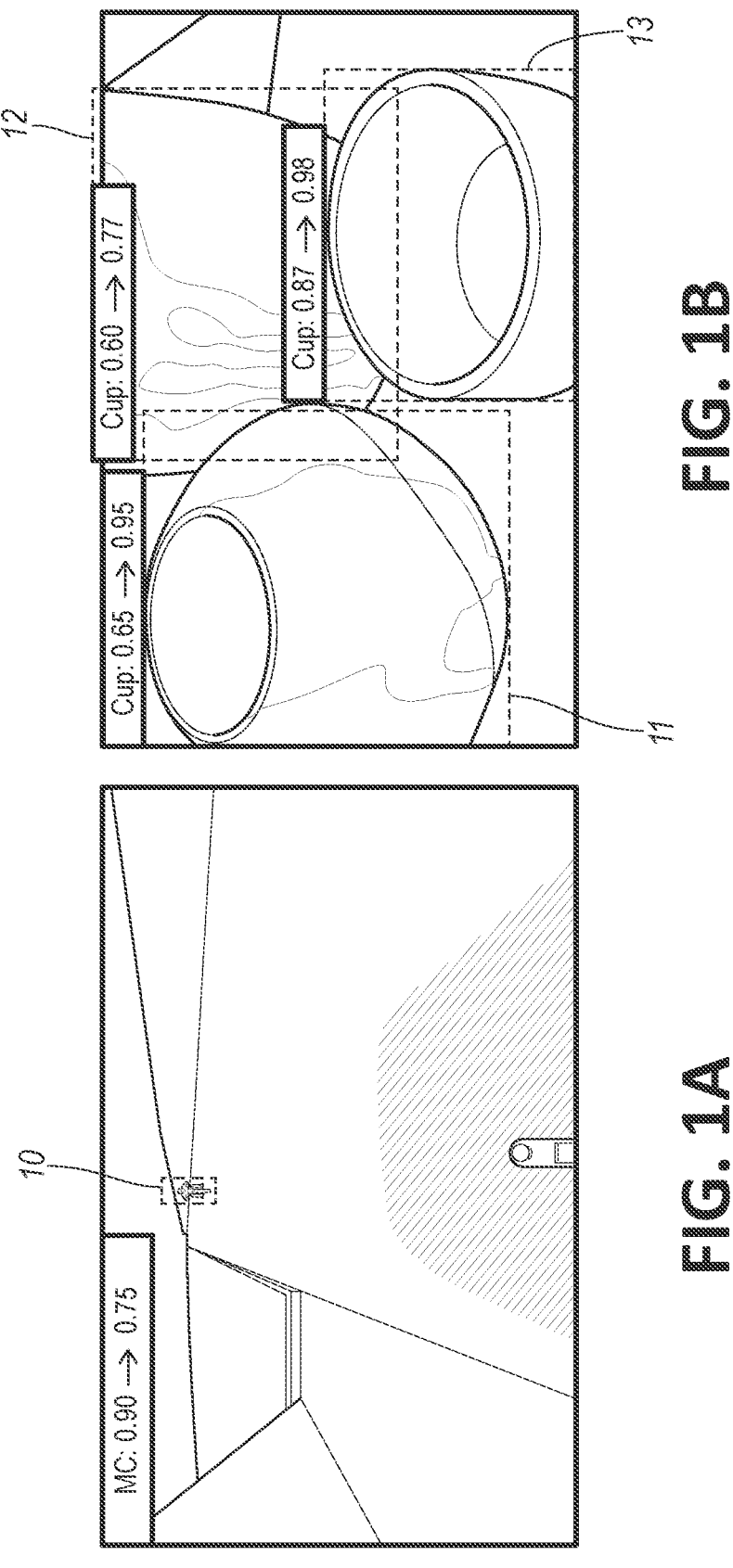
FIG. 1A illustrates an example of an over-confident detection and the impact of WB-TS on the corresponding output score.
FIG. 1B illustrates an example of under-confident detections and the impact of WB-TS on the corresponding output scores.

The present disclosure addresses the growing use of object detection DNNs for perception tasks in automated driving. Such DNNs classify objects based upon multiple classes they have been trained to recognize and localize the object. It has been found that DNNs can be mis-calibrated depending upon the choice of architecture, dataset, and training parameters (see Guo, Chuan, et al. "On calibration of modern neural networks." International Conference on Machine Learning. PMLR, 2017). Mis-calibration error determines the extent of deviation of scores from the true performance accuracy of the DNN. When the scores are higher than the accuracy of the model, the scores are said to be over-confident. In other cases, when the scores are lower than the accuracy of the model, the scores are said to be under-confident.

As used herein with respect to calibration of an object detection DNN, black-box calibration refers to calibration of data after a non-maximum suppression (NMS) step, whereas white-box calibration refers to calibration of raw data, i.e., prior to any NMS step. Additionally, Platt scaling is a known parametric approach to calibration. The non-probabilistic predictions of a classifier are used as features for a logistic regression model, which is trained on the validation set to return probabilities. In the context of a NN, Platt scaling learns scalar parameters a, $b \in R$ and outputs $q\hat{}_i = \sigma(az_i + b)$ as the calibrated probability. Parameters a and b can be optimized using the negative log likelihood (NLL) loss over the validation set.

Temperature scaling is the simplest extension of Platt scaling and uses a single scalar parameter T>0 for all classes K (where K>2). Given the logit vector $z_i$, the new confidence prediction is:

$$\hat{q}_i = \max_k \sigma_{SM}(z_i / T)^{(k)}$$

T is called the temperature, and it "softens" the Softmax (i.e., raises the output entropy) with T>1. As T→∞, the probability $q\hat{}_i$ approaches 1/K, which represents maximum uncertainty. With T=1, the original probability $p\hat{}_i$ is recovered. As T→0, the probability collapses to a point mass (i.e., $q\hat{}_i = 1$). The temperature T is optimized with respect to NLL loss on the validation set. Accordingly, as used herein, the term "temperature" refers to a scalar parameter used in calibration and does not refer to the degree or intensity of heat present in a substance or object.

The present disclosure includes a white-box temperature scaling (WB-TS) to provide calibration of object detection DNNs. WB-TS extends temperature scaling calibration designed for classification tasks to object detection tasks. As explained below, this is done by calibrating the classification branch of object detection DNNs while conditioning on the regression branch. In addition to enabling calibration of object detection DNNs, WB-TS helps provide calibrated scores that capture uncertainties as triggered by distance, occlusion, or unseen object classes. In accordance with the present disclosure, the pre-NMS detection box predictions associated with an input image of the object detection DNN contain class and object location details (position and dimensions). The class information is retrieved from the classification branch. Class logits (i.e., functions that represent probabilities in logarithmic form) in this branch are scaled prior to NMS operation. This scaling can result in the logits (and subsequent Sigmoid/Softmax confidence scores) being well-calibrated. Thus, WB-TS may provide better confidence scores and permit enhanced operation of multiple autonomous driving (AV) and/or advanced driver assistance systems (ADAS).

In one or more implementation of the present disclosure, a system includes a computer including a processor and a memory. The memory stores instructions executable by the processor programmed to determine uncertainty estimation in an object detection deep neural network (DNN). It accomplished this by: retrieving a calibration dataset from a validation dataset, wherein the calibration dataset includes scores associated with all object classes in an image, including a background (BG) class, determining background ground truth boxes in the calibration dataset by comparing ground truth boxes with detection boxes generated by the object detection DNN using an intersection over union (IoU) threshold, correcting for class imbalance between the ground truth boxes and the background ground truth boxes in a ground truth class by updating the ground truth class to include a number of background ground truth boxes based on a number of ground truth boxes in the ground truth class, and updating output data sets of the object detection DNN based on the class imbalance correction.

In an implementation, the instructions for determining background ground truth boxes in the calibration set may take both classification and regression branches into account by setting the IoU threshold to be the same as an IoU threshold used for training and evaluating the object detection DNN.

In another implementation, the calibration dataset may include logits and detection boxes prior to non-maximum suppression (pre-NMS). Variations of this implementation may include instructions to: determine an average number of pre-NMS detection boxes in non-BG classes as k; and extract a top k pre-NMS detection boxes in the BG class using corresponding model scores.

In yet another implementation, the system may include instructions to retrieve the calibration dataset by randomly choosing samples from an original pool of samples belonging to the BG class to match an average number of samples in non-BG classes. In a variation of this implementation, the instructions may further report a final expected calibration error (ECE) as an average over 10 obtained calibration datasets.

In an implementation, the instructions to estimate uncertainty may further include instructions to determine a single scalar parameter of a temperature T for all classes by optimizing for the negative log likelihood (NLL) loss. Variations of this implementation may further include instructions to uniformly scale logit vectors of object detections in a test dataset prior to non-maximum suppression (pre-NMS) with the temperature T prior to a Sigmoid/Softmax layer. Variations of this implementation may further include instructions to: after the Sigmoid/Softmax layer, perform non-maximum suppression on calibrated confidence scores with corresponding bounding box predictions to obtain final detections; and actuate a vehicle component based upon an object detection determination of the object detection DNN. If the output Sigmoid class probability does not account for the BG class, implementations may further include instructions to: explicitly add another dimension to the probability distribution to represent the BG class that is: assigned a value of 0 for pre-NMS detection boxes with IoU greater than the IoU threshold and 1 for pre-NMS detection boxes with IoU less than the IoU threshold; and convert obtained confidence scores back to logits.

In one or more implementation of the present disclosure, a method may include determining uncertainty estimation in an object detection deep neural network (DNN) by: retrieving a calibration dataset from a validation dataset, wherein the calibration dataset includes scores associated with all object classes in an image, including a background (BG) class, determining background ground truth boxes in the calibration dataset by comparing ground truth boxes with detection boxes generated by the object detection DNN using an intersection over union (IoU) threshold, correcting for class imbalance between the ground truth boxes and the background ground truth boxes in a ground truth class by updating the ground truth class to include a number of background ground truth boxes based on a number of ground truth boxes in the ground truth class, and updating output data sets of the object detection DNN based on the class imbalance correction.

In an implementation, the method may further include determining background ground truth boxes in the calibration dataset takes both classification and regression branches into account by setting the IoU threshold to be the same as an IoU threshold used for training and evaluating the object detection DNN.

In an implementation, the calibration dataset may include logits and detection boxes prior to non-maximum suppression (pre-NMS). A variation of this implementation may further include: determining an average number of pre-NMS detection boxes in non-BG classes as k, and extracting a top k pre-NMS detection boxes in the BG class using corresponding model scores.

Another implementation may further include obtaining the calibration dataset by randomly choosing samples from an original pool of samples belonging to the BG class to match an average number of samples in non-BG classes. A variation of this implementation may further include reporting a final expected calibration error (ECE) as an average over 10 obtained calibration datasets.

In an implementation, the method may further include determining a single scalar parameter of a temperature T for all classes by optimizing for the negative log likelihood (NLL) loss. A variation of this implementation may further include uniformly scaling logit vectors of object detections in a test dataset prior to non-maximum suppression (pre-NMS) with the temperature T prior to a Sigmoid/Softmax layer. Another variation of this implementation may further include, after the Sigmoid/Softmax layer, performing non-maximum suppression on calibrated confidence scores with corresponding bounding box predictions to obtain final detections, and actuating a vehicle component based upon an object detection determination of the object detection DNN. If the output Sigmoid class probability does not account for the BG class, a variation of the method may further include: explicitly adding another dimension to the probability distribution to represent the BG class that: assigns a value of 0 for pre-NMS detection boxes with IoU greater than the IoU threshold and 1 for pre-NMS detection boxes with IoU less than the IoU threshold, and converts obtained confidence scores back to logits.

FIG. IA shows an example of an output with overconfidence. The DNN used is SSD Mobilenet V3 (see Liu, Wei, et al. "SSD: Single shot multibox detector." European conference on computer vision. Springer, Cham, 2016) trained on an internal motorcycle detection dataset. After WB-TS calibration, the value associated with the motorcycle detected decreases. This can be physically interpreted as a response to uncertainty triggered by distance of the object from the observer (discussed below). FIG. 1B shows an example of under-confident detections. Here, the DNN used is RetinaNet (see Lin, Tsung-Yi, et al. "Focal loss for dense object detection." Proceedings of the IEEE international conference on computer vision. 2017), trained on MSCOCO dataset (see Lin, Tsung-Yi, et al. "Microsoft coco: Common objects in context." European conference on computer vision. Springer, Cham, 2014). As illustrated, the DNN model is under-confident prior to WB-TS calibration. Post calibration, the values increase to align with the true performance of the model.

Temperature scaling (TS) for neural network (NN) calibration was first introduced by Guo et al. in the context of image classification. Image classification involves predicting the class of one object in an image. However, object detection used for perception purposes also includes object localization, which refers to identifying the location of one or more objects in an image and drawing a bounding box around their extent.

As discussed above, in TS, a single scalar value, i.e., temperature T, is used to scale the classification network's non-probabilistic output before the Softmax layer, i.e., logit vector $z_i \in R^C$ corresponding to the input image $I_i$, where C is the number of classes. In equation 1, $\hat{p}_i$ is the calibrated model score of the predicted class for image $I_i$. ("Logit" herein has the standard mathematical definition of a function that is the inverse of the standard logistic function). T is obtained by optimizing for negative log likelihood (NLL) on the calibration dataset. For random variables $X \in \chi$ (input) and $Y \in \rho = \{1, \ldots, C\}$ (class label) with ground truth joint distribution $\pi(X, Y)$, given a probabilistic model $\pi^{\hat{}}(X, Y)$ and n samples, the negative log likelihood is defined by equation 2.

$$\hat{p}_i = \max_{k=1}^{C}(\sigma_{softmax}(z_{ik} / T)) \tag{1}$$

$$NLL = -\sum_{i=1}^{n} \log(\hat{\pi}(y_i | x_i)) \tag{2}$$

Most state-of-the-art object detection networks have a classification branch and a regression branch that output class confidence scores and bounding boxes respectively. This is followed by a non-maximum suppression (NMS) layer, in which the predicted boxes are distilled to remove redundant boxes using a manually tuned intersection over union (IoU) threshold. WB-TS of the present disclosure is performed in two stages—calibration, and inference. Algorithm 1 in Table 1 below presents the pseudocode for the calibration stage of WB-TS.

TABLE 1

| Algorithm 1 Calibration Stage |
| --- |

Input: Trained DNN; Set of images I : $\{I_i\} \forall$ i ∈ [0, N)
Output: Temperature T
1:    L : $\{L_{ij}\} \forall$ i ∈ [0,N), j ∈ [0,M) ← ∅    ▷Predicted logits
2:    C : $\{c_{ij}\} \forall$ i ∈ 0, N), j ∈ [0, M) ← ∅    ▷Ground truth
3:    for every image I, do
4:      Z ← $\{z_j\} \forall$ j ∈ [0, M)    ▷Retrieve pre-NMS logits
5:      X ← $\{X_j\} \forall$ j ∈ [0, M)    ▷Retrieve pre-NMS boxes
6:      G ← $(G_j) \forall$ j ∈ [0, M)    ▷Map ground truth boxes
7:      for every box $X_j$ do
8:        if (IoU($X_j$, $G_j$) > threshold) then
9:          $c_{ij}$ ← Class($G_j$)    ▷Update ground truth class
10:        else
11:          $c_{ij}$ ← BG    ▷Update ground truth as background
12:        end if
13:        $L_{ij}$ ← $z_j$    ▷Update predicted logit vector
14:      end for
15:    end for
16:    $C_B$ ← $\{c_{ij} \in C : c_{ij} == BG\}$    ▷Set of boxes with ground
17:    if $|C_B| >> |C \backslash C_B|$ then
18:      L, C ← Balance(L, C)
19:    end if
20:    T ← NLL(L, C)

First, the calibration dataset is retrieved from the validation dataset. WB-TS takes into account the scores associated with every class in an image, including the background (BG) class.

Next, parsing for the ground-truth for the calibration dataset takes into account both the classification and regression branches. This is achieved by choosing the IoU threshold in line 8 of Table 1 to be the same as the one used for training and evaluation of the object detection DNN.

Use of detection boxes prior to non-maximum suppression (pre-NMS boxes) in line 8 of Table 1 can ensure inclusion of information pertaining to boxes belonging to the BG class since these boxes are typically unavailable post-NMS. Such a calibration setting is also theoretically consistent with the calibration setting for pure classification tasks. However, it does result in some implementational roadblocks. For instance, the number of pre-NMS boxes belonging to the BG class is typically much higher than the number of pre-NMS boxes associated with object classes. To ensure that the class imbalance incurred by excessive BG detections does not suppress the mis-calibration error exhibited by non-BG detections, the top k boxes for the BG class are extracted using the corresponding model scores. In examples, in every image, k is chosen to be approximately the same as the average number of pre-NMS boxes in non-BG classes to balance the effect of BG class detections and non-BG class detections.

However, if the class imbalance persists (as is usually the case in multi-class object detectors), as a pre-processing step, this can be corrected by randomly choosing samples from the original pool of samples belonging to the BG class such that they match the average number of samples in non-BG classes.

One measure of miscalibration is the difference in the expectation between confidence and accuracy. This can be approximated as an expected calibration error (ECE) by partitioning predictions into M equally spaced bins and taking a weighted average of the bins' accuracy/confidence difference per Equation 3:

$$ECE = \sum_{m=1}^{M} \frac{|B_m|}{n} |acc(B_m) - conf(B_m)|, \tag{3}$$

where n is the number of samples and $B_m$ is the set of indices of samples whose prediction confidence falls into the interval $I_m = (m-1/M, m/M]$.

The final ECE is reported as an average over 10 such extractions. This averaging step is helpful because ECE as a metric is typically not robust with respect to class imbalance or label shift. The calibration dataset, thus obtained, is used for determining temperature T by optimizing for the NLL loss.

The optimized temperature T is then used to perform inference on the test dataset as shown in Algorithm 2 in Table 2 below.

TABLE 2

| Algorithm 2 Inference Stage |
| --- |

Input: Trained DNN; Temperature T; Test Image I
Output: Calibrated detections X'
1: Z ← $\{z_j\} \forall$ j ∈ [0, M)    ▷ Retrieve pre-NMS logits
2: X ← $\{X_j\} \forall$ j ∈ [0, M)    ▷ Retrieve pre-NMS boxes
3: S ← $\{s_j = \emptyset\} \forall$ j ∈ [0, M)    ▷ Initialize output scores
4: for every box $X_j$ do
5:    $z_j'$ ← $z_j/T$    ▷ Scale logit vector
6:    $s_j$ ← $\sigma_{softmax}(z_j')$    ▷Get calibrated score vector
7: end for
8: X', S' ← NMS(X, S)

In this stage, the logit vectors associated with the pre-NMS detections are uniformly scaled with the temperature T prior to the Sigmoid/Softmax layer. Post Sigmoid/Softmax, the calibrated scores, with their corresponding bounding box predictions, are post-processed with non-maximum suppression (NMS) to obtain the final detections. Some implementations of RetinaNet output Sigmoid class probability distribution without accounting for the BG class. In such cases, another dimension is explicitly added to the probability distribution to represent the BG class. It is assigned a value of 0 for pre-NMS boxes with IoU>an IoU threshold and 1 for pre-NMS boxes with IoU<the IoU threshold. After this step, the confidence scores are converted back to logits. This can be achieved for Sigmoidal distributions since in such distributions the probabilities are not required to sum to 1.

White-box temperature scaling can be used to integrate temperature scaling in the object detection pipeline. Advantageously, a calibration dataset can be provided in which the ground truth accounts for background detections (at pre-NMS stage) unlike prior work. Existing methods (see Kuppers, Fabian, et al. "Multivariate confidence calibration for object detection." *Proceedings of the IEEF/CVF Conference on Computer Vision and Pattern Recognition Workshops.* 2020) use pre-NMS detections greater than (>) an IoU threshold to act as true positives and pre-NMS detections less than (<) the IoU threshold as false positives. They do not account for false negatives (a natural consequence of their ground truth design).

The design of WB-TS of the present disclosure helps produce calibrated scores that capture uncertainties resulting from distance, occlusion, and out-of-distribution data. Thus, WB-TS can ensure that the DNN model is well-calibrated and enable uncertainty estimation. The accuracy-preserving property of TS helps ensure that WB-TS successfully calibrates the model without affecting the object detection performance of the model, as measured by mAP, accuracy, precision, recall, and F1-score. Additionally, previous work (see Kuppers, et al. and Schwaiger, Franziska, et al. "From black-box to white-box: Examining confidence calibration under different conditions." *arXiv preprint arXiv: 2101.02971, 2021*) uses final output score corresponding to output class along with box location and dimensions for calibration. The present disclosure relies solely on the non-probabilistic logit distribution of pre-NMS boxes (over all classes including background class) for calibration and does not explicitly use box location or dimensions.

Figure 2A:
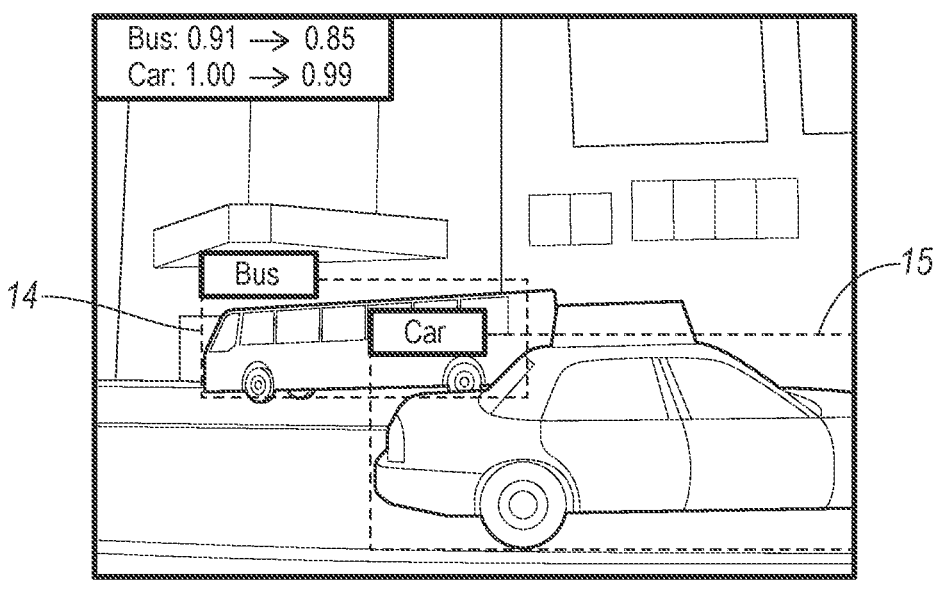
FIG. 2A illustrates an example of a physical interpretation of calibrated scores as triggered by distance.
Figure 2B:
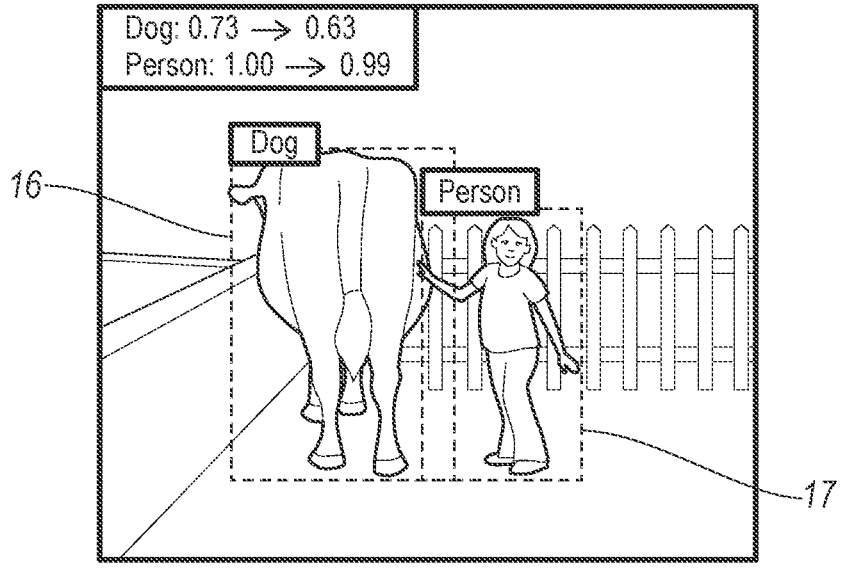
FIG. 2B illustrates an example of a physical interpretation of calibrated scores as triggered by occlusion.
Figures 2C, 3A, 3B, 3C, 3D:
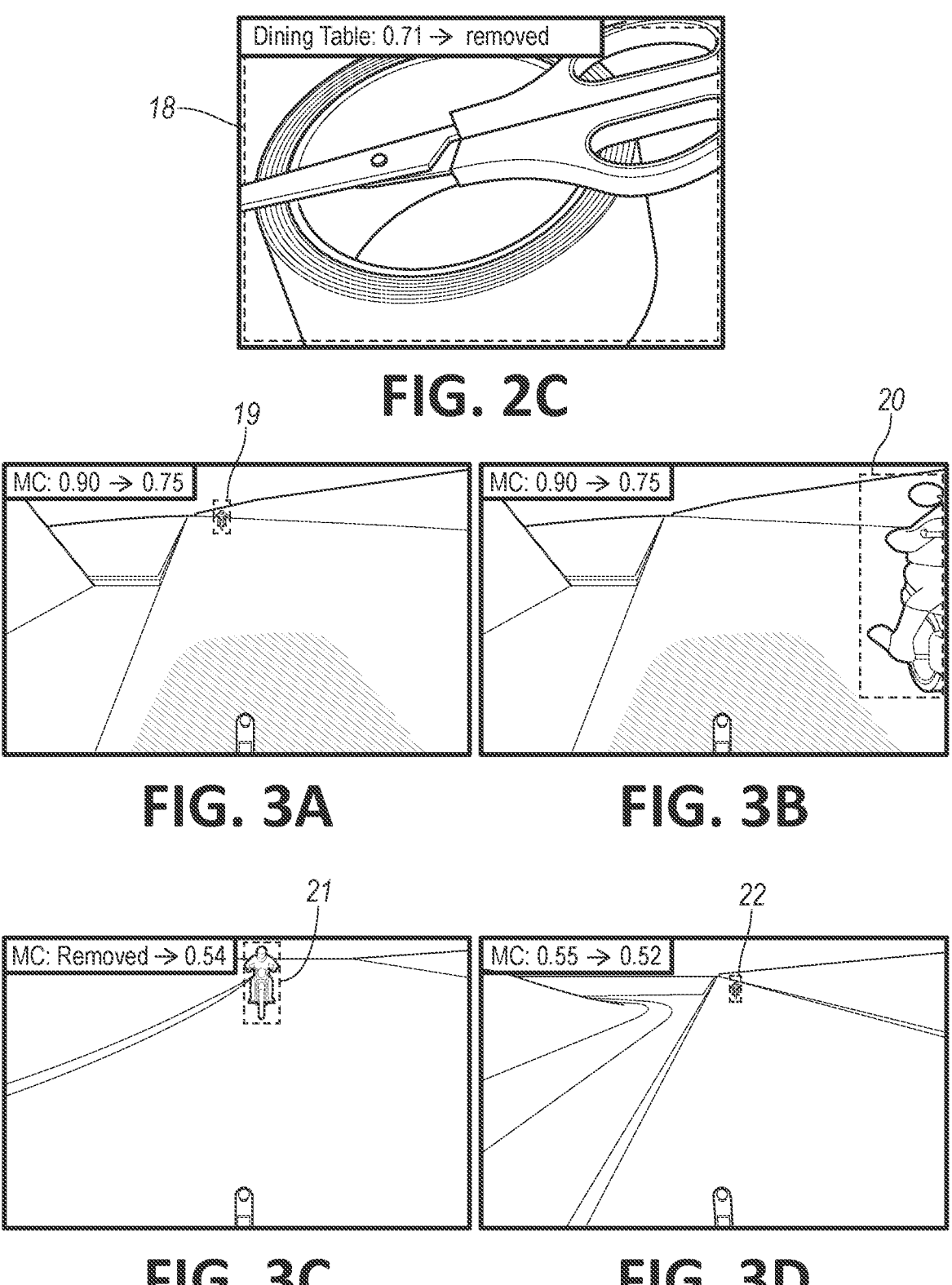
FIG. 2C illustrates an example of a physical interpretation of calibrated scores as triggered by out of distribution (OOD) target samples.
FIG. 3A illustrates an example of a physical interpretation of calibrated scores as triggered by distance in an internal motorcycle detection dataset.
FIG. 3B illustrates an example of a physical interpretation of calibrated scores as triggered by occlusion in an internal motorcycle detection dataset.
FIG. 3C illustrates an example of a physical interpretation of calibrated scores as triggered by false negatives in an internal motorcycle detection dataset.
FIG. 3D illustrates an example of a physical interpretation of calibrated scores as triggered by false positives in an internal motorcycle detection dataset.

In FIG. 2A, for an SSD MobilenetV2 model trained on a Pascal VOC 2007 training dataset and tested on the corresponding test set, the object that is farther away from the observer (bus) experiences a greater reduction in output calibrated score as opposed to the nearer object belonging to class car. Similarly, in FIG. 2B, the incorrectly classified object dog with an unconventional viewpoint is subject to greater reduction in score than the accompanying correctly classified person detection. In FIG. 2C, an image from the MSCOCO dataset mentioned above is used to test the SSD model trained on the VOC 2007 dataset. The out of distribution (OOD) object scissors, which was not previously seen by the model, is incorrectly classified as a dining table without WB-TS. Using WB-TS, it is removed after calibration since the temperature is used to scale the distribution of logits such that they more accurately reflect the true statistical performance of the object detection DNN.

Such a design of WB-TS is useful and directly relevant to object detection DNN based applications like motorcycle detection. FIGS. 3A, 3B, 3C, and 3D show the empirical results obtained by testing WB-TS on SSD MobilenetV3 object detection DNN trained on internal motorcycle detection dataset. FIG. 3A is the same as FIG. IA and illustrates an example of a physical interpretation of calibrated scores as triggered by distance in an internal motorcycle detection dataset. FIG. 3B illustrates an example of a physical interpretation of calibrated scores as triggered by occlusion in an internal motorcycle detection dataset. FIG. 3C illustrates an example of a physical interpretation of calibrated scores as triggered by false negatives in an internal motorcycle detection dataset and shows that WB-TS calibrated scores can help detect false negatives. An object that was previously undetected is detected post WB-TS calibration. Similarly, FIG. 3D illustrates an example of a physical interpretation of calibrated scores as triggered by false positives in an internal motorcycle detection dataset, wherein the WB-TS calibrated score associated with false positive detection is reduced. These examples empirically show that WB-TS scales up the final predictions of false negatives so that they are detected post calibration. Similarly, WB-TS scales down the predictions associated with false positives such that their confidence scores reduce and reflect the presence of false positives in the image. Thus, WB-TS can account for false positives and false negatives, which is challenging in current systems.

Figure 4:
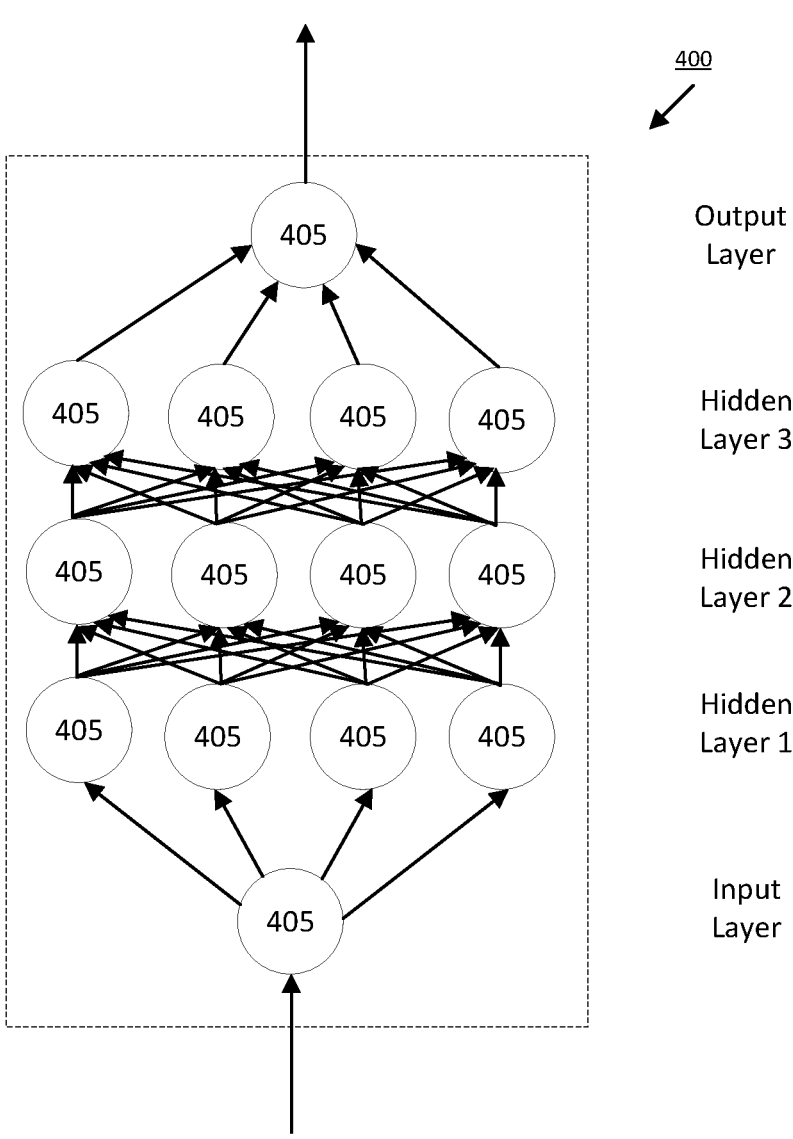
FIG. 4 is an example diagram of a deep neural network.

FIG. 4 is a diagram of an example deep neural network (DNN) 400 that can be trained for object detection, such as for autonomous driving. The DNN 400 can be a software program that can be loaded in memory and executed by a processor included in a computer, for example. In an example implementation, the DNN 400 can include, but is not limited to, a convolutional neural network (CNN), R-CNN (Region-based CNN), Fast R-CNN, and Faster R-CNN. The DNN 400 includes multiple nodes, and the nodes are arranged so that the DNN 400 includes an input layer, one or more hidden layers, and an output layer. Each layer of the DNN 400 can include a plurality of nodes 405. While FIG. 4 illustrates two hidden layers, it is understood that the DNN 400 can include additional or fewer hidden layers. The input and output layers for the DNN 400 may include more than one node 405.

The nodes 405 are sometimes referred to as artificial neurons 405 because they are designed to emulate biological, e.g., human, neurons. A set of inputs (represented by the arrows) to each neuron 405 are each multiplied by respective weights. The weighted inputs can then be summed in an input function to provide, possibly adjusted by a bias, a net input. The net input can then be provided to an activation function, which in turn provides a connected neuron 405 an output. The activation function can be a variety of suitable functions, typically selected based on empirical analysis. As illustrated by the arrows in FIG. 4, neuron 405 outputs can then be provided for inclusion in a set of inputs to one or more neurons 405 in a next layer.

As one example, the DNN 400 can be trained with ground truth data, i.e., data about a real-world condition or state. For example, the DNN 400 can be trained with ground truth data and/or updated with additional data by a processor of the remote server computer 140. Weights can be initialized by using a Gaussian distribution, for example, and a bias for each node 405 can be set to zero. Training the DNN 400 can include updating weights and biases via suitable techniques such as back-propagation with optimizations. Ground truth data used for training can include, but is not limited to, image data manually labeled by human operators as specifying data that allows the computer to detect objects for autonomous driving operations.

Figure 5:
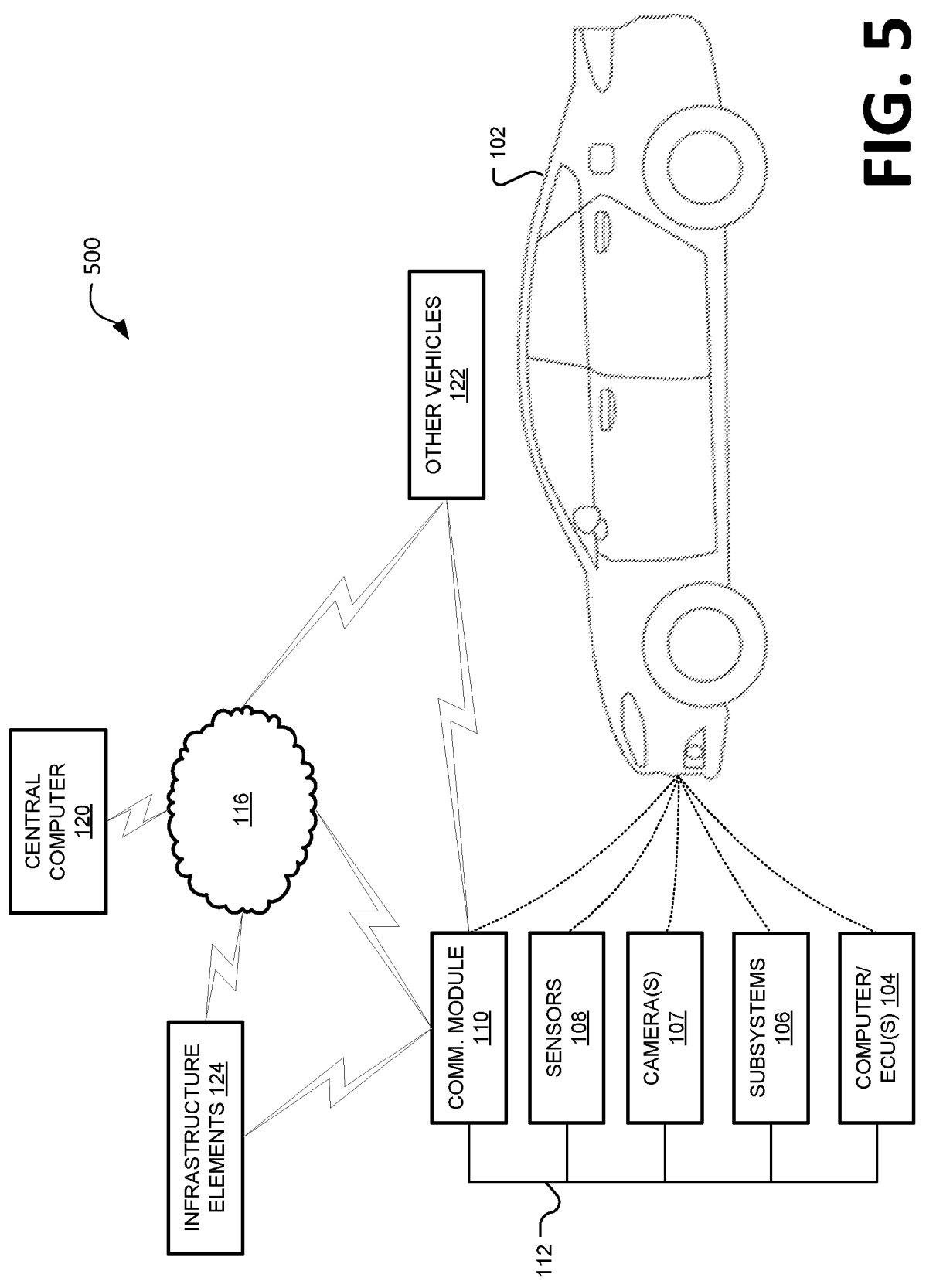
FIG. 5 is an example of a vehicular system for using a deep neural network.

With reference to FIG. 5, a connected vehicle system 500 can provide communications between a vehicle 102 that may use a DNN 400 for autonomous vehicle operation and one or more other vehicles 122, infrastructure elements 124, and a central computer 120 to share data among the various entities.

Vehicle 102 is a set of components or parts, including hardware components and typically also software and/or programming, to perform a function or set of operations in the vehicle 102. Vehicle subsystems 106 typically include a braking system, a propulsion system, and a steering system as well as other subsystems including but not limited to a body control system, a climate control system, a lighting system, and a human-machine interface (HMI) system, which may include an instrument panel and/or infotainment system. The propulsion subsystem converts energy to rotation of vehicle 102 wheels to propel the vehicle 102 forward and/or backward. The braking subsystem can slow and/or stop vehicle 102 movement. The steering subsystem can control a yaw, e.g., turning left and right, maintaining a straight path, of the vehicle 102 as it moves.

Computers, including the herein-discussed one or more vehicle computers or electronic control units (ECUs) 104 (sometimes referred to herein as vehicle computer 104), processors in other vehicles 122, infrastructure elements 124, and central computer 120, include respective processors and memories. A computer memory can include one or more forms of computer readable media, and stores instructions executable by a processor for performing various operations, including as disclosed herein. For example, the computer can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

A computer memory can be of any suitable type, e.g., EEPROM, EPROM, ROM, Flash, hard disk drives, solid state drives, servers, or any volatile or non-volatile media. The memory can store data, e.g., a memory of an ECU 104. The memory can be a separate device from the computer, and the computer can retrieve information stored in the memory, e.g., one or more computers/ECUs 104 can obtain data to be stored via a vehicle network 112 in the vehicle 102, e.g., over an Ethernet bus, a CAN bus, a wireless network, etc. Alternatively, or additionally, the memory can be part of the computer, i.e., as a memory of the computer or firmware of a programmable chip.

The one or more computers/ECUs 104 can be included in a vehicle 102 that may be any suitable type of ground vehicle 102, e.g., a passenger or commercial automobile such as a sedan, a coupe, a truck, a sport utility, a crossover, a van, a minivan, etc. As part of an autonomous vehicle (AV) system, computer/ECU 104 may include programming to operate one or more of vehicle 102 brakes, propulsion (e.g., control of acceleration in the vehicle 102 by controlling one or more of an internal combustion engine, electric motor, hybrid engine, etc.), steering, climate control, interior and/or exterior lights, etc., as well as to determine whether and when the computer, as opposed to a human operator, is to control such operations, such as by sending vehicle data over the vehicle network 112. Additionally, a computer/ECU 104 may receive data from DNN 400 and may be programmed to determine whether and when a human operator is to control such operations.

A vehicle computer 104 may include or be communicatively coupled to, e.g., via a vehicle network 112 such as a communications bus as described further below, more than one processor, e.g., included in sensors 108, cameras 107, electronic controller units (ECUs) 104 or the like included in the vehicle 102 for monitoring and/or controlling various vehicle components, e.g., a powertrain controller, a brake controller, a steering controller, etc. The computer is generally arranged for communications on a vehicle 102 communication network that can include a bus in the vehicle 102 such as a controller area network (CAN) or the like, and/or other wired and/or wireless mechanisms. Alternatively, or additionally, in cases where the computer actually includes a plurality of devices, the vehicle network 112 may be used for communications between devices represented as the computer in this disclosure.

A vehicle 102 in accordance with the present disclosure includes a plurality of sensors 108 that may support the AV functions. For example, sensors 108 may include, but are not limited to, one or more wheel speed sensors, GPS sensor, ultrasonic parking sensor, short range RADAR, medium range RADAR, LiDAR, light sensor, rain sensor, accelerometer, etc. Sensors 108 may also include A/C pressure sensors, air quality sensors (i.e., odor sensors) and/or humidity sensors to support the climate control system. Sensors 108 may also include those under control of a body control module (BCM), such as accelerometers, seatbelt sensors, airbag deployment sensors, and the like.

A vehicle 102 in accordance with the present disclosure includes one or more cameras 107 that may support the AV functions. For example, the camera(s) 107 may include one or more interior cameras to monitor passengers and interior portions of the vehicle 102. The camera(s) 107 may also include one or more exterior cameras, including one or more forward-facing camera that may image the ground in front of vehicle 102, one or more rear-ward facing camera that may image the ground behind the vehicle 102, one or more side-facing camera that may image the ground next to vehicle 102, and/or one or more under-vehicle camera.

The vehicle network 112 is a network via which messages can be exchanged between various devices in vehicle 102. The vehicle computer 104 can be generally programmed to send and/or receive, via vehicle network 112, messages to and/or from other devices in vehicle 102 e.g., any or all of ECUs, sensors, cameras, actuators, components, communications module, a human machine interface HMI, etc. Additionally, or alternatively, messages can be exchanged among various such other devices in vehicle 102 via a vehicle network 112. In cases in which the computer includes a plurality of devices, vehicle network 112 may be used for communications between devices represented as a computer in this disclosure. In some implementations, vehicle network 112 can be a network in which messages are conveyed via a vehicle 102 communications bus. For example, vehicle network 112 can include a controller area network (CAN) in which messages are conveyed via a CAN bus, or a local interconnect network (LIN) in which messages are conveyed via a LIN bus. In some implementations, vehicle network 112 can include a network in which messages are conveyed using other wired communication technologies and/or wireless communication technologies e.g., Ethernet, WiFi, Bluetooth, Ultra-Wide Band (UWB), etc. Additional examples of protocols that may be used for communications over vehicle network 112 in some implementations include, without limitation, Media Oriented System Transport (MOST), Time-Triggered Protocol TTP, and FlexRay. In some implementations, vehicle network 112 can represent a combination of multiple networks, possibly of different types, that support communications among devices in vehicle 102. For example, vehicle network 112 can include a CAN in which some devices in vehicle 102 communicate via a CAN bus, and a wired or wireless local area network in which some device in vehicle 102 communicate according to Ethernet or WI-FI communication protocols.

The vehicle computer 104, other vehicles 122, infrastructure elements 124, and/or central computer 120 can communicate via a wide area network 116. Further, various computing devices discussed herein may communicate with each other directly, e.g., via direct radio frequency communications according to protocols such as Bluetooth or the like. For example, a vehicle 102 can include a communication module 110 to provide communications with devices and/or networks not included as part of the vehicle 102, such as the wide area network 116 and/or other vehicles 122 and infrastructure elements 124, for example. The communication module 110 can provide various communications, e.g., vehicle to vehicle (V2V), vehicle-to-infrastructure or everything (V2X) or vehicle-to-everything including cellular communications (C-V2X) wireless communications cellular, dedicated short range communications (DSRC), etc., to another vehicle 102, to an infrastructure element typically via direct radio frequency communications and/or typically via the wide area network 116, e.g., to the central computer 120. The communication module 110 could include one or more mechanisms by which a vehicle computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

The other vehicles 122, infrastructure elements 124, and/ or drones 126 may use any suitable wireless communications, such as cellular or WI-FI, such as to communicate with the central computer 120 via the wide area network 116.

With reference to FIG. 6, a flow chart for a process 600 of performing a WB-TS procedure is illustrated.

At a first block 615, a calibration dataset is retrieved from the validation dataset of the objection detection DNN. The calibration dataset includes scores associated with all object classes in an image, including the background (BG) class;

Next, at block 620, the method parses for ground truth in the calibration dataset using an intersection over union (IoU) threshold that is set the same as the IoU threshold used for training the objection detection DNN. Here, background ground truth boxes in the calibration dataset are determined by comparing ground truth boxes with detection boxes generated by the object detection DNN using the IoU threshold.

To correct for possible class imbalance if there are many more BG class detections than non-BG class detections, at block 625 the number of BG class boxes for each image is limited based upon the number of non-BG class boxes to be approximately the same. For example, an average number of pre-NMS detection boxes in non-BG classes may be determined as k, and a top k pre-NMS detection boxes in the BG class may be selected using corresponding model scores.

Next, at block 630, a scalar value of the temperature T may be determined by optimizing for the NLL loss. Since the temperature T is determined on the dataset that includes the BG class and is prior to any non-maximum suppression, this is a white-box (WB) calibration.

At block 635, the determined temperature T is used to scale logit vectors of pre-NMS detections.

Next, at block 640, the logit vector values are normalized to values between 0 and 1, such as with a Sigmoid or Softmax layer.

At block 645, the method performs non-maximum suppression on the calibrated scores and bounding box predictions to obtain final predictions from the object detection DNN.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random-access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system, such as one of those mentioned above, and are accessed via a network in any one or more of a variety of manners. A file system may be accessible from a computer operating system and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system, comprising a computer including a processor and a memory, the memory storing instructions executable by the processor programmed to:

determine uncertainty estimation in an object detection deep neural network (DNN) by:

retrieving a calibration dataset from a validation dataset, wherein the calibration dataset includes confidence scores of respective object classes in an image, including a background (BG) class, and includes logits and detection boxes prior to non-maximum suppression (pre-NMS);

determining an average number of pre-NMS detection boxes in non-BG classes as k;

extracting a top k pre-NMS detection boxes in the BG class using corresponding model scores;

determining background ground truth boxes in the calibration dataset by comparing ground truth boxes with detection boxes generated by the object detection DNN using an intersection over union (IoU) threshold;

correcting for class imbalance between the ground truth boxes and the background ground truth boxes in a ground truth class by updating the ground truth class to include a number of background ground truth boxes based on a number of ground truth boxes in the ground truth class; and updating output datasets of the object detection DNN based on the class imbalance correction.

2. The system of claim 1, wherein the instructions for determining background ground truth boxes in the calibration set take both classification and regression branches into account by setting the IoU threshold to be the same as an IoU threshold used for training and evaluating the object detection DNN.

3. The system of claim 1, further including instructions to:

retrieve the calibration dataset by randomly choosing samples from an original pool of samples belonging to the BG class to match an average number of samples in non-BG classes.

4. The system of claim 3, further including instructions to:

report a final expected calibration error (ECE) as an average over 10 obtained calibration datasets.

5. The system of claim 1, wherein the instructions to estimate uncertainty further include instructions to:

determine a single scalar parameter of a temperature T for all classes by optimizing for a negative log likelihood (NLL) loss.

6. The system of claim 5, further including instructions to:

uniformly scale logit vectors of object detections in a test dataset prior to non-maximum suppression (pre-NMS) with the temperature T prior to a Sigmoid/Softmax layer.

7. The system of claim 6, further including instructions to:

after the Sigmoid/Softmax layer, perform non-maximum suppression on calibrated confidence scores with corresponding bounding box predictions to obtain final detections; and actuate a vehicle component based upon an object detection determination of the object detection DNN.

8. The system of claim 7, wherein if an output Sigmoid class probability does not account for the BG class, further including instructions to:

explicitly add another dimension to the probability distribution to represent the BG class that is:

assigned a value of 0 for pre-NMS detection boxes with IoU greater than the IoU threshold and a value of 1 for pre-NMS detection boxes with IoU less than the IoU threshold; and convert obtained confidence scores back to logits.

9. A method comprising:

determining uncertainty estimation in an object detection deep neural network (DNN) by:

retrieving a calibration dataset from a validation dataset, wherein the calibration dataset includes confidence scores of respective object classes in an image, including a background (BG) class, and includes logits and detection boxes prior to non-maximum suppression (pre-NMS);

determining an average number of pre-NMS detection boxes in non-BG classes as k;

extracting a top k pre-NMS detection boxes in the BG class using corresponding model scores:

determining background ground truth boxes in the calibration dataset by comparing ground truth boxes with detection boxes generated by the object detection DNN using an intersection over union (IoU) threshold;

correcting for class imbalance between the ground truth boxes and the background ground truth boxes in a ground truth class by updating the ground truth class to include a number of background ground truth boxes based on a number of ground truth boxes in the ground truth class; and updating output datasets of the object detection DNN based on the class imbalance correction.

10. The method of claim 9, wherein determining background ground truth boxes in the calibration dataset takes both classification and regression branches into account by setting the IoU threshold to be the same as an IoU threshold used for training and evaluating the object detection DNN.

11. The method of claim 9, further including:

obtaining the calibration dataset by randomly choosing samples from an original pool of samples belonging to the BG class to match an average number of samples in non-BG classes.

12. The method of claim 11, further including:

reporting a final expected calibration error (ECE) as an average over 10 obtained calibration datasets.

13. The method of claim 9, further including:

determining a single scalar parameter of a temperature T for all classes by optimizing for a negative log likelihood (NLL) loss.

14. The method of claim 13, further including:

uniformly scaling logit vectors of object detections in a test dataset prior to non-maximum suppression (pre-NMS) with the temperature T prior to a Sigmoid/Softmax layer.

15. The method of claim 14, further including:

after the Sigmoid/Softmax layer, performing non-maximum suppression on calibrated confidence scores with corresponding bounding box predictions to obtain final detections; and actuating a vehicle component based upon an object detection determination of the object detection DNN.

16. The method of claim 15, wherein if an output Sigmoid class probability does not account for the BG class, further including explicitly adding another dimension to the probability distribution to represent the BG class that:

assigns a value of 0 for pre-NMS detection boxes with IoU greater than the IoU threshold and a value of 1 for pre-NMS detection boxes with IoU less than the IoU threshold; and converts obtained confidence scores back to logits.

* * * * *